Feb. 23, 1965     L. L. HARRISON     3,170,572
HIGH SPEED SORTING CONVEYOR

Filed Sept. 28, 1961     3 Sheets-Sheet 1

INVENTOR:
LAWRENCE L. HARRISON,
BY *D. Emmett Thompson*
HIS ATTORNEY.

Feb. 23, 1965   L. L. HARRISON   3,170,572
HIGH SPEED SORTING CONVEYOR
Filed Sept. 28, 1961   3 Sheets-Sheet 2

INVENTOR:
LAWRENCE L. HARRISON,
BY *D. Emmett Thompson*
HIS ATTORNEY.

Feb. 23, 1965  L. L. HARRISON  3,170,572
HIGH SPEED SORTING CONVEYOR
Filed Sept. 28, 1961  3 Sheets-Sheet 3
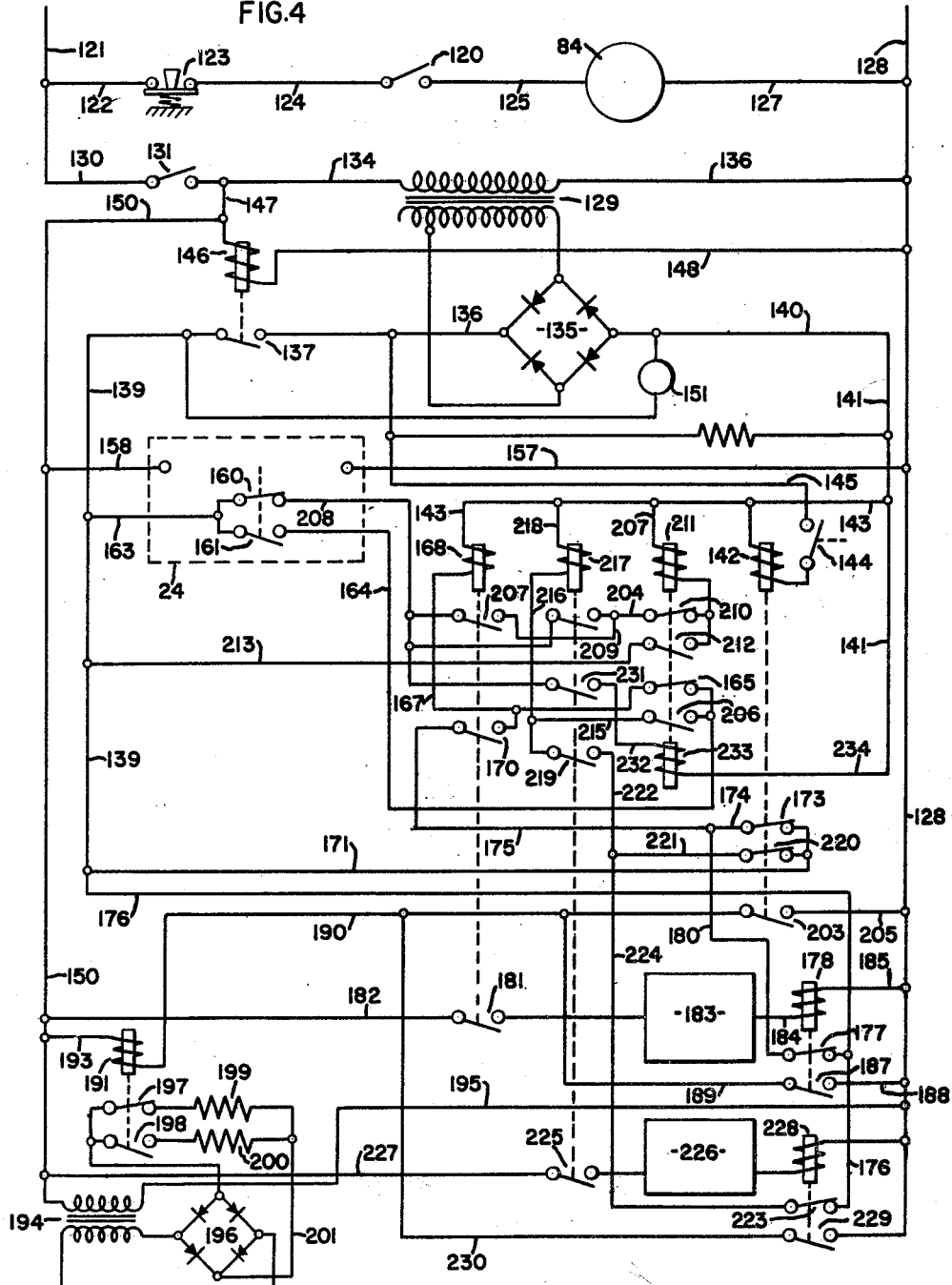
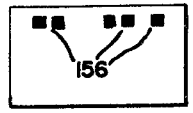
FIG.5
INVENTOR:
LAWRENCE L. HARRISON,
BY D. Emmett Thompson
HIS ATTORNEY.

United States Patent Office 3,170,572
Patented Feb. 23, 1965

3,170,572
HIGH SPEED SORTING CONVEYOR
Lawrence L. Harrison, Syracuse, N.Y., assignor to Lamson Corporation, Syracuse, N.Y., a corporation of New York
Filed Sept. 28, 1961, Ser. No. 141,485
6 Claims. (Cl. 209—74)

This invention relates to conveyor systems and more particularly to a sorting unit operable to direct articles advancing in single file procession on a conventional conveyor to branch conveyors.

In large manufacturng plants, warehouses, etc., it is often desirable to selectively direct articles advancing in a procession on a conventional conveyor to different departments, or receiving stations. At the present time, there are in use various types of apparatus for selectively switching or transferring selected articles from a conveyor to branch conveyors. However, such apparatus is especially constructed for a particular installation and is not arranged, or constructed, to function at high speed with articles advancing in close adjacency on the main conveyor, and which articles may vary in dimension.

This invention has as an object a sorting unit embodying a compact unitary structure adapted to be readily inserted in a conventional straight line conveyor system, and which functions to transfer selected ones of the articles bearing a code distinction from the conveyor for delivery to a branch conveyor.

The invention has as a further object a sorting or transfer conveyor unit capable of sorting out articles advancing at high speed in close or abutting arrangement, and functioning with high efficiency regardless of considerable variations in the dimension of the articles.

The invention consists in the novel features and in the combinations and constructions hereinafter set forth and claimed.

In describing this invention, reference is had to the accompanying drawings in which like characters designate corresponding parts in all the views.

In the drawings—

FIGURE 4 is a schematic diagram of the electrical control circuity, and

FIGURE 5 is a bottom plan view of an article, such as a box, bearing a code destination.

The invention consists generally of a live roll conveyor section adapted to be readily arranged, or inserted, in a conventional conveyor line. Certain of the rolls in this section are of varying length and spaced apart axially so as to provide two diagonally extending passages.

This conveyor section includes pairs of sprockets about which endless chains are trained for movement in said diagonally extending passages, the chains being provided with article engaging lugs whereby, upon rotation of the sprockets, the chain lugs engage an article advancing on the main conveyor and transfer it diagonally from its normal path of movement in the main conveyor line for advancement over a second path extending to a particular station.

This live roll conveyor section is of extended width relative to the main conveyor, and a branch conveyor is arranged at the downstream end of this section to receive articles that have been transferred laterally from the path of the main conveyor. Power means is provided for actuating the sprockets and chains in accordance with a code destination applied to the articles moving on the main conveyor.

Figure 1:
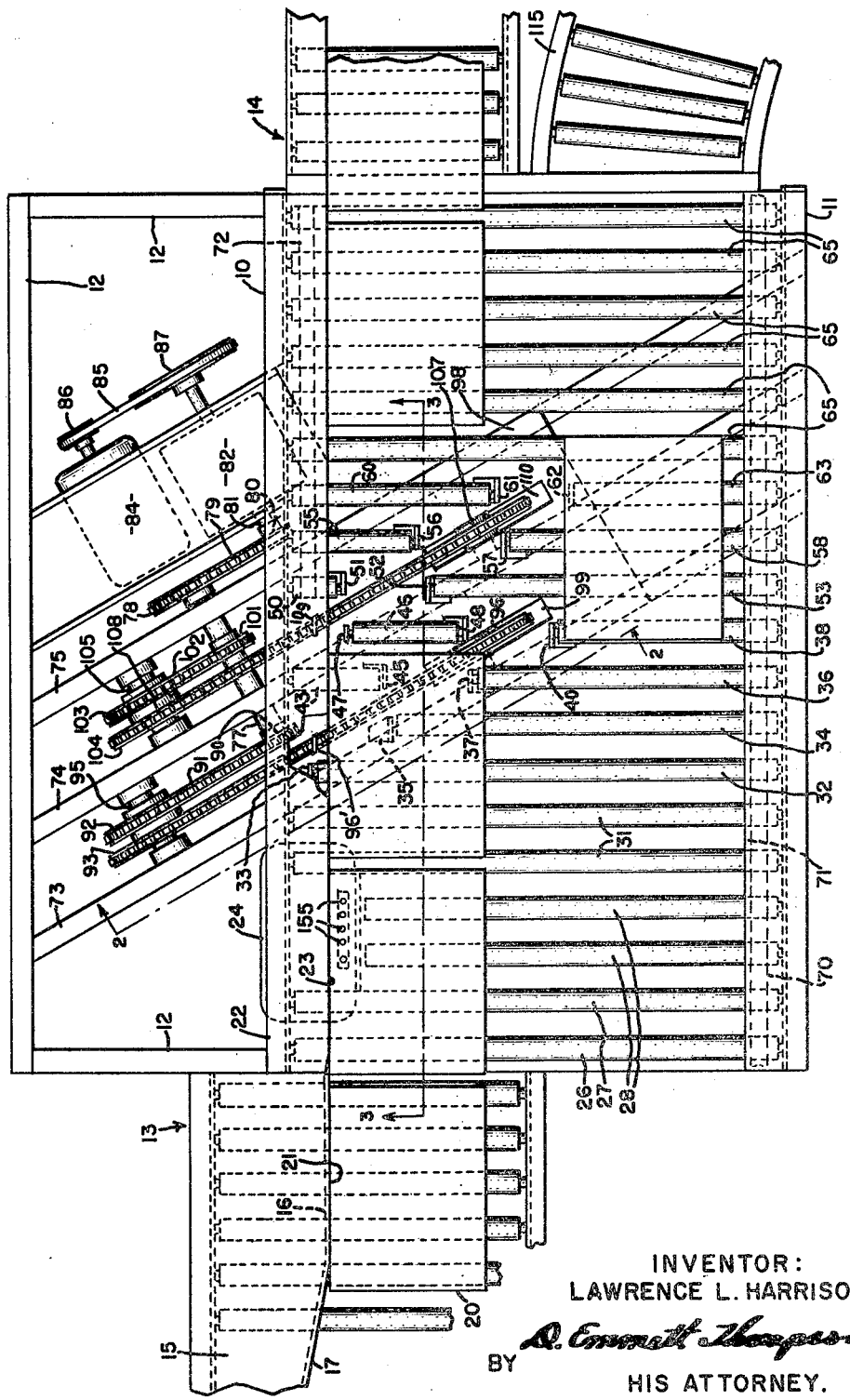
FIGURE 1 is a top plan view of a conveyor section, or unit, embodying my invention and showing contiguous portions of a conventional conveyor.

Referring to FIGURE 1 of the drawings, 10, 11, designate channel-shaped side members of the live roll conveyor section which is mounted on and supported by a suitable framework 12. 13 designates generally a conventional roll conveyor, and 14 is a continuation of the main conveyor. The main conveyor section 13 is provided at its rear side with a guide rail 15 in the form of a flat plate and having a depending flange 16 along its inner edge, the up-stream portion 17 of which extends at an angle to arrange the advancing articles, such as a shipping case or box 20, with the rear side of the box slidably engaging the straight portion 21 of the flange 16.

There is a similar guide plate 22 mounted on the live roll section having its inner edge 23 forming a continuation of the edge 21 of the plate 15. The function of the guide plates 15, 22, is to assure uniform positioning of the articles so that the code designation applied to the bottom thereof will pass in accurate registration with the article detecting means 24 hereinafter more particularly referred to.

The rolls 26, 27, extend between the side members 10, 11, of the live roll section adjacent the up-stream section 13 of the main conveyor. Adjacent rolls 28 are journalled at their outer ends in side member 11, and at their inner ends in brackets supported by a cross member 30, these rolls being foreshortened to provide an area for the scanning or detecting means 24 to scan the designation code on the bottom of the boxes. The next adjacent rolls 31 extend the entire width of the section and being journalled at their ends in the side members 10, 11. The next adjacent roll 32 is journalled at its inner end in a bracket 33 spaced a short distance inwardly from the side member 10. The next adjacent roll 34 is likewise foreshortened having its inner end journalled in a bracket 35 spaced a greater distance inwardly from the side member 10 than the bracket 33. The next roll 36 is journalled at its inner end in a bracket 37, and the roll 38 is journalled in a bracket 40. It will be noted, in referring to FIGURE 1, the brackets 33, 35, 37 and 40, are located progressively a greater distance inwardly from the rear side member 10. There is a short roll 43 arranged in spaced axial relation to the roll 36. This roll 43 is journalled at one end in the side member 10, and at its opposite end in a bracket 45. There is a short roll 46 arranged in axial spaced relation to the roll 38. This roll is journalled at its inner end in a bracket 47 spaced inwardly from the rear side member 10 and in a bracket 48 spaced from the bracket 40 of roll 38. A short roll 50 is journalled at one end in the side member 10, and at its opposite end in a bracket 51 spaced from a bracket 52 in which a relatively long roll 53 is journalled at its inner end, the outer end being journalled in the side member 11. A roll 55 of somewhat greater length than the roll 50 is journalled at its inner end in the side member 10, and its outer end in a bracket 56 which is spaced inwardly from a bracket 57 in which the inner end of the roll 58 is journalled.

A roll 60 is journalled at its inner end in the side member 10, and at its outer end in a bracket 61 spaced inwardly from a bracket 62 in which the inner end of roll 63 is journalled. The remaining rolls designated 65 extend the full width of the section, as do the rolls 26, 27 and 31.

It will be observed that the rolls of various lengths in the central portion of the section are so arranged as to provide a pair of diagonally extending passageways. All of the rolls having their ends journalled in the outer side member 11 are live rolls—that is, they are driven as by a chain 70 in the conventional manner of live roll conveyor arrangement. The end roll 65 at the right, FIGURE 1, is provided with a sprocket on its inner end over which a chain 72 is trained for engagement with sprockets on rolls 50, 55 and 60, so that these rolls are also driven. This effects rotation of the rolls to advance articles to the right, FIGURE 1. The live roll section is also provided with a guide plate 71 affixed to the outer side member 11.

There are three channel members 73, 74, 75, mounted in the framework 12 and extending diagonally across the live roll section in parallel relationship to each other, and other passages formed by the rolls of various lengths. There is a jack shaft 77 journalled in the cross members 74, 75. A sprocket 78 is affixed to one end of the shaft 77 to receive a chain 79 which is also trained over a sprocket 80 mounted on the output shaft 81 of a clutch unit 82. This clutch unit is operated by a continuous running motor 84 connected to the clutch unit by belt 85 trained over a pulley 86 on the motor, and a pulley 87 on the input shaft of the clutch unit.

Figure 2:
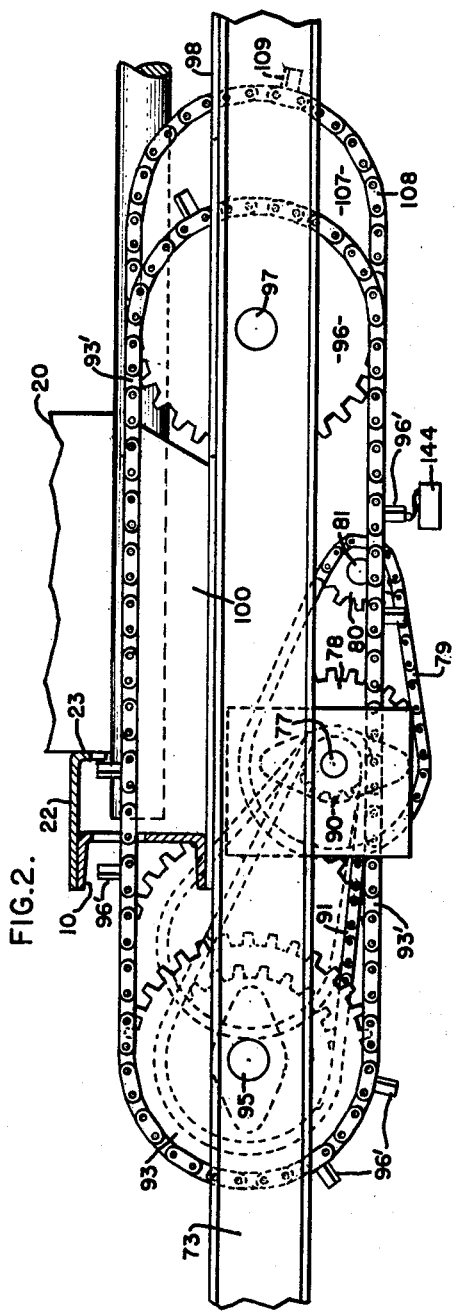
FIGURE 2 is a view taken on a line corresponding to line 2—2, FIGURE 1.
Figure 3:
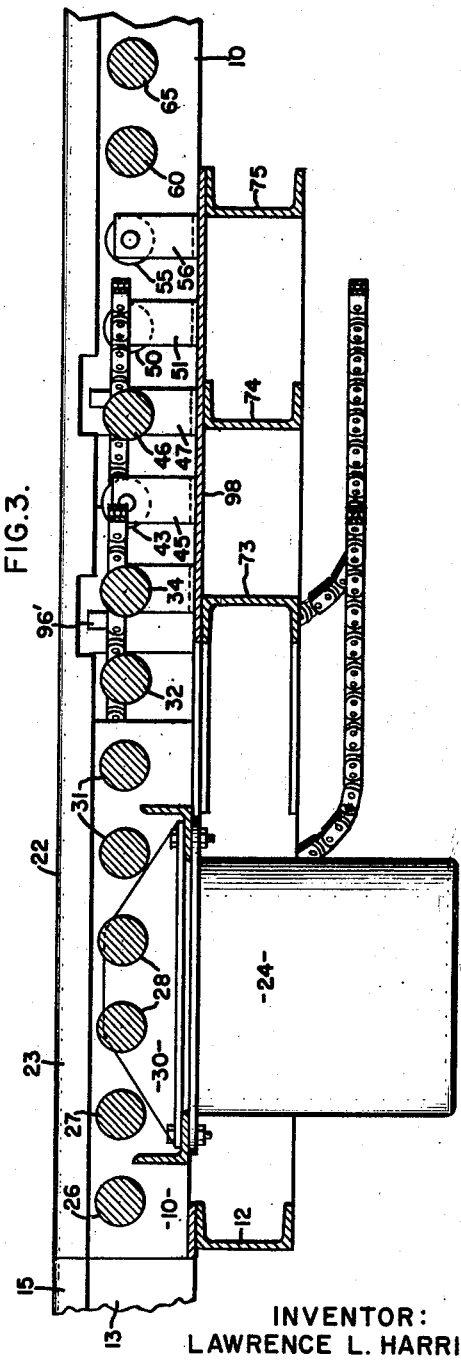
FIGURE 3 is a view taken on line 3—3, FIGURE 1.

The shaft 77 has affixed to its opposite end a sprocket 90, see FIGURE 2, to receive a chain 91 trained over a sprocket 92 fixedly secured to a sprocket 93. The sprockets 92, 93, are journalled for rotation on a stub shaft 95 mounted between the cross members 73, 74. There is a sprocket 96 journalled on a stub shaft 97 affixed to the cross member 73 and positioned in registration with the sprocket 93. A transfer chain 93' is trained over the sprockets 93, 96 and is provided at spaced intervals with article engaging lugs 96'. A plate 98 is mounted upon the upper surfaces of the cross members 73, 74, 75, and extends forwardly from the rear side member 10. The forward portion of this plate is formed with a slot 99 to receive the sprocket wheel 96. A block 100 is fixed on the plate 98 and extends underneath the upper run of the chain 93' to support the same intermediate the rear side member 10 and the sprocket 96.

A sprocket 101, see FIGURE 1, is fixed to the shaft 77 to receive a chain 102 trained about a sprocket 103 secured to a sprocket 104. These sprockets 103, 104, are fixedly mounted on a shaft 105 journalled in the cross members 74, 75. A sprocket 107 is journalled on a stub carried by the cross member 74 and is arranged in alinement with the sprocket 104. A second transfer chain 108 is trained about the sprockets 104, 107, and is provided with article engaging lugs 109, the plate 98 being apertured as at 110 to receive the sprocket 107. A block similar to block 100 is provided to support the upper run of the chain 108.

Normally, the chains 98, 108, remain at rest with the article engaging lugs 96', 109, positioned rearwardly of the depending flange on the article guide plate 22, see FIGURES 1 and 2. When a package advances over the detector 24 and is supplied with a code designation requiring the package to be transferred from the path of the main conveyor section 13, 14, the clutch unit 82 is engaged when the package advances to a position in registration with the transfer chains to effect rotation of the chain and sprocket drive arrangement, whereby the package engaging members 96', 109, move to the right, FIGURE 2, and push the article in the diagonal path transversely of the live roll conveyor section. This section then, through the instrumentality of the driven rolls, advances the package to a branch conveyor section 115.

Referring to the schematic wiring diagram, FIGURE 4, the motor 84 is energized by closing the starting switch 120, the circuit being from one side 121 of the power supply through the wire 122, stop switch 123, wire 124, starting switch 120, wire 125, motor 84, wire 127 to the opposite side 128 of the power supply.

A transformer 129 is connected across the supply, through wire 130, manually operable switch 131, wire 134, transformer 129, wire 136 to the side 128.

The secondary of this transformer is connected to a full wave rectifier 135, one side of the output of which is connected by wire 136 to contacts 137 to wire 139. The opposite side of the rectifier is connected by wire 140 to wire 141, which is connected to relay coil 142 by wire 143. The opposite side of relay 142 is connected to a switch 144 which is connected to wire 145, extending to wire 136 connected on the opposite side of the rectifier.

The switch 144 is positioned to be held open by an article engaging lug 96' or 109 on one of the transfer chains 93', 108, while the chains are at rest, see FIGURE 2. The contacts 137 are closed by relay 146, one side of which is connected to wire 134 by wire 147. The opposite side of relay 146 is connected to wire 128 by wire 148. The relay 146 is of the time delay type to permit certain components, later described, operated by the alternating current circuit 128, 150, to reach operating temperature before the machine is put in service. The wire 150 extends from the wire 134. A pilot light 151 is connected across the output of the rectifier, one side of the pilot light being connected with the wire 140 and the opposite side to the wire 139, through the contacts 137. The pilot light, accordingly, indicates when the contacts 137 have been closed.

The article detecting device may involve different arrangements, depending on the type of code designation employed. For example, it may consist of a series of photo-electric cell units 155, see FIGURE 1, which are responsive to a selected code printed on the bottom of the article, or box, as shown in FIGURE 5, in which the code is in the form of selective spaced colored dots 156. With this arrangement, the number in spacing of the printed area comprises the code to which the particular unit is responsive. The detector unit forms, per se, no part of my invention. Model 410, Automatic Carton Selector, manufactured by Atronic Products, Inc., Bala-Cynwid, Pa., may be used.

Referring to FIGURE 4, the detector 24 is shown in dotted outline and is supplied with power from the supply 128, 150, by wires 157, 158. This unit includes a pair of contacts 160, 161. The contacts 160 are normally closed, and the contacts 161 are normally open. When an article, or carton passes over the device 24, bearing a code to which the detector is responsive, the contacts 161 momentarily close and the contacts 160 momentarily open. The closed contacts 161 will establish a circuit from the side 139 of the rectified output through wire 163, contacts 161, wire 164, closed contacts 165, wire 167 to relay coil 168, the opposite side of which is connected to wire 143, which extends to the rectified side 141.

Contacts 170 of relay 168 close providing a hold circuit for the relay extending from the side 139 through wire 171, normally closed contacts 173 of relay 142, wire 174, wire 175, closed contacts 170 to wire 167.

There is also a branch circuit from the wire 139 through wire 176, normally closed contacts 177 of relay 178 to wire 180 which is connected to the wire 175, which extends through the closed hold contacts 170, previously referred to. Contacts 181 of relay 168 are now closed and provide a circuit from wire 150 through wire 182, contact 181 to an adjustable timer 183. When this timer times out, it provides power pulse through wire 174 to momentarily energize the relay 178, the opposite side of which is connected by wire 185 to the side 128. When relay 178 is thus energized, its contacts 177 open, and its contacts 187 close. Closing of the contacts 187 establishes a circuit from wire 128, wire 188, contacts 187, wires 189, 190 to relay coil 191, the opposite side of which is connected to the side 150, as by wire 193. A transformer 194 is connected across the supply 128, 150 by wire 195. The secondary of the transformer 194 is connected to a full wave rectifier 196. One side of the output of the rectifier is connected to normally closed contacts 197 and normally open contacts 198. The contacts 197 in normally closed condition, energize a coil 199 applying a brake to the clutch unit 82. The contact 198, when closed, energizes a coil 200 effecting engagement of the clutch 82. Accordingly, when relay 191 is energized, the contacts 197 are opened to de-energize the brake coil 199, and the contacts 198 are closed to energize the clutch engaging coil 200. The opposite sides of the coils 199, 200 are connected by wire 201 to the opposite side of the rectified output.

Thus effecting engagement of the clutch unit 82, the transfer chains 93', 108 immediately advance to effect diagonal movement of a carton for discharge on the branch conveyor 115. Immediately upon the movement of these chains, switch 144 is closed energizing the relay 142, closing its contacts 203, which are connected in shunt with the contact 187 to provide a branch holding circuit for the relay coil 191, the contacts 203 being connected to wire 128 by wire 205, and the opposite side of the contacts are connected to the wire 190. This branch holding circuit assures that the relay 191 will remain energized with its contacts 198 closed to provide clutch engagement until the carton has been transferred.

The timer 183 is adjusted to time out during movement of the article, or carton, from the scanning device 24 to a position in registration with the pushing lugs 96', 109. The timer 183 is supplied with power to time out because relay 168 has been locked in to maintain its contacts 181 closed. The holding of relay 168 is necessitated by the short duration during which the detector contacts 161 are closed. Immediately upon advancement of the transfer chains, the contacts 144 close and remain closed until they are opened by a succeeding chain lug 96', 109, again opening the contacts 144 at which time the article, or carton, has been completely transferred. The closing of contacts 144 energizes relay 142 closing its contacts 203 to provide a continuous energization of the relay 191, and accordingly the clutch engaging coil 200. Energization of the relay 142 will effect opening of its contacts 173, and also with energization of the relay 178 its contacts 177 will open thus disconnecting wire 175 from the side 128 interrupting the holding circuit for relay 168 which will then drop out.

When the article, or carton, has been transferred, the contacts 144 will open by the next succeeding chain lug, as explained, de-energizing the relay 142, opening the contacts 203 which served to provide a running circuit for the clutch coil 200 during the transfer operation.

The next article passing over the detector 24 and provided with proper code designation will again close contacts 161. However, contacts 165 will now be opened and contacts 206 will be closed. The reason for this contact arrangement is that when the relay 168 was energized by the previous article, its contacts 207 were closed, and remained closed as long as the relay 168 remained energized through the holding contacts 170. This provided a circuit from wire 139, contacts 160, which closed as the carton advanced from the detector unit, thus supplying power from wire 163 to wire 208, closed contacts 207, wire 209, closed contacts 210 of relay 211, to the relay coil, the opposite side of which is connected to wire 143, extending to the rectified side 141. The energization coil 211 moved its contacts 165 to open position, and closed its contacts 206. Also contacts 212 were closed to provide a holding circuit from wire 213, connected to wire 139. Accordingly when the next succeeding package closed the contacts 161, contacts 206 were closed supplying power through wire 215, 216 to relay coil 217, the opposite side of which is connected by wire 218 to wire 143. The relay 217 is provided with holding contacts 219 to provide a holding circuit from wire 171, contacts 220, wires 221, 222, contacts 219, wire 216 to relay 217. This hold circuit is continued, after contacts 220 open upon energization of relay 142, by a circuit extending from wire 176 through contacts 223 of relay 228, wire 224 to wire 222.

The relay 217, thus energized with its contacts 225 closed a circuit is completed to a timer 226 by wire 227, contacts 225, timer 226. This timer is identical to the timer 183. When the timer 226 times out, it energizes the relay 228 closing its contacts 229 connected to the side 128 and completing a circuit through wire 230 to wire 190. This provides another operating circuit for again initially energizing the relay coil 191 to again energize the clutch engaging coil 200. Power is continued on the wire 190 by the closing of contacts 203 by the closing of contacts 144 to energize the relay 142, in the manner previously described in connection with the transfer of the first carton. The energization of relay 217 by the second carton closes contacts 231. When the contacts 160 close because of the passage of the carton from the detector device 24, power is supplied from the side 139 through wire 163, closed contacts 160, wire 208, closed contacts 231, wire 232, relay coil 233, wire 234 to the side 141. This results in opening the hold contacts 212 and contacts 206, and the reclosing of contacts 210, 165. The opening of contacts 206 opens the hold circuit for relay 217, whereby the contact arrangement is reset to original form for actuation by the next article bearing the code designation.

This arrangement involving the two timers 183, 226, and the two transfer relays 211, 233, permits the transfer of two adjacent or successive cartons. When the first coded carton moves over the sensing device 24, one timer, as timer 183, is energized and starts timing to effect movement of the transfer chains when that carton has advanced to a position in registration with the chains. The next following carton, if coded for transfer, energizes the second timer as 226 and it starts to time before the preceding carton reaches the transfer position. Accordingly, when adjacent or successive cartons are to be transferred, there is a period when both timers will be in operation.

It will be apparent, my sorting device will transfer articles bearing a code designation from an advancing procession of articles, even if the articles are advancing in abutting relation. This is accomplished because the angle and speed of the transfer chains are such that the article being transferred moves forwardly during transfer at the same speed as the advancement of articles in the procession. The transfer section can be readily installed in a conventional roll conveyor and functions to effectively transfer articles which may vary considerably in dimension.

What I claim is:

1. A high speed sorting conveyor including a main conveyor structure for advancing a procession of articles over a predetermined path at a predetermined speed along the predetermined path, certain of said articles being provided with a code designation for delivery to a branch conveyor for advancement over a second path, said main conveyor including a live roll transfer section of extended width, a branch conveyor at the down-stream end of said section, certain of the rolls of said section being of varying length and some of said rolls of varying length being arranged in axially aligned and axially spaced apart relation to provide passages extending diagonally of said section, article pushers movable in said passages for engaging and moving articles diagonally from said predetermined path for discharge to said branch conveyor, and power means operable in response to a code designation on an article advancing in said procession for effecting such movement of said article pushers for moving said articles diagonally and simultaneously advancing the same at said predetermined speed, in the original direction while maintaining the original orientation of said articles.

2. A high speed sorting conveyor including a main conveyor structure for advancing a procession of articles over a predetermined path at a predetermined speed along the predetermined path, certain of said articles being provided with a code designation for delivery to a branch conveyor for further advancement along a second path, said main conveyor including a live roll transfer section, certain of the rolls of said section being of varying length and some of said rolls of varying length being arranged in axially aligned and axially spaced apart relation to provide passages extending diagonally of said section, sprockets journalled in said section, endless chains trained over said sprockets with the upper runs of said chains positioned for movement in said passages, article engaging lugs on said chains for engaging and pushing an article from said path for delivery to said branch conveyor, power means operable in response to a code designation on an article in said procession to effect rotation of said sprockets for the lateral movement of articles while maintaining advancement of said articles at said predetermined speed in the original direction and without changing the original orientation of said articles for delivery to said branch conveyor.

3. A high speed sorting main conveyor including a conveyor structure for advancing a procession of articles over a predetermined path, certain of said articles being provided with a code designation for delivery to a branch conveyor for further advancement along a second path, said main conveyor including a live roll section operable to advance said procession at a predetermined speed along said main conveyor, certain of the rolls of said section being of varying length and some of said rolls of varying length being arranged in axially aligned and axially spaced apart relation to provide passages extending diagonally of said section, sprockets journalled in said section, endless chains trained over said sprockets with the upper runs of said chains positioned for movement in said passages, article engaging lugs on said chains for engaging and pushing an article from said predetermined path for delivery to said branch conveyor upon movement of the upper runs of the chains in said passages, power means operable when actuated to move said chains at a speed to maintain forward advancement of the articles at said predetermined speed while simultaneously moving said articles diagonally from said predetermined path, whereby the original orientation of said articles remains unchanged, code sensing means positioned contiguous to said conveyor and operable in response to a code designation on an article in said procession to effect rotation of said sprockets for movement of said chains in said diagonal passages.

4. A high speed sorting conveyor including a main conveyor structure for continuously advancing a procession of articles over a linear path at a predetermined speed, certain of said articles being provided with a code designation for delivery to a branch conveyor for further advancement along a second path, said main conveyor including a live roll section for effecting such advancement of the articles, certain of the rolls of said section being of varying length and some of said rolls of varying length being arranged in axial alignment and axial spaced apart relation to provide passages extending diagonally of said section, sprocket wheels journaled in said section, a pair of endless chains trained over said sprockets with the upper runs of said chains positioned in parallel spaced apart relation for movement in said passages, a plurality of pairs of article engaging lugs on said chains, a motor connected to said sprockets and operable when energized to rotate said sprockets to move a pair of said lugs on said chains through said passages for engagement with and transfer of an article from said main conveyor to said branch conveyor, said motor being so operable to effect such movement of the article to maintain the forward advancement thereof at said predetermined speed while simultaneously moving the article diagonally of the main conveyor, whereby to maintain the original orientation of said article, a code sensing device positioned contiguous to the path of said main conveyor and operable in response to a code designation on an article advancing on said main conveyor to energize said motor.

5. A high speed sorting conveyor including a main conveyor structure for continuously advancing a procession of articles over a linear path at a predetermined speed, certain of said articles being provided with a code designation for delivery to a certain branch conveyor for further advancement along a second path, said main conveyor including a live roll section, certain of the rolls of which are of varying length and some of said rolls of varying length being arranged in axially aligned and axially spaced apart relation to provide passages extending diagonally of said section, sprocket wheels journaled in said section, a pair of endless chains trained over said sprockets with the upper runs of said chains extending in spaced parallel relation for movement in said passages, a plurality of pairs of article engaging lugs on said chains, a motor connected to said sprockets and operable when energized to effect rotation thereof to move a pair of said lugs on said chains through said passages for engagement with and transfer of an article from said linear path for discharge to a branch conveyor, said motor being so operable to effect movement of said chains at a speed to maintain the forward advancement of the article at said predetermined speed while simultaneously moving it diagonally from said main conveyor to maintain the original orientation of said article during the transfer thereof from said linear path, a timer operable a predetermined time after actuation to energize said motor, a code sensing device positioned contiguous to said linear path of said main conveyor upstream from said passages and operable in response to a code designation on an article on said main conveyor to actuate said timer, and means operable independently of the transferred article to de-energize said motor when said chains have moved a predetermined distance.

6. A high speed sorting conveyor as defined in claim 5, and including rigid guide means for supporting the upper runs of said chains in said diagonally extending passages.

References Cited in the file of this patent

UNITED STATES PATENTS

| | | |
|---|---|---|
| 1,380,691 | Tuohy | June 7, 1921 |
| 1,937,303 | Worrall | Nov. 28, 1933 |
| 2,508,086 | Alvarez | May 16, 1950 |
| 3,018,873 | Burt | Jan. 30, 1962 |

UNITED STATES PATENT OFFICE
CERTIFICATE OF CORRECTION

Patent No. 3,170,572                                February 23, 1965

Lawrence L. Harrison

It is hereby certified that error appears in the above numbered patent requiring correction and that the said Letters Patent should read as corrected below.

Column 2, line 26, before "side" insert -- the --; column 4, line 4, for "on" read -- to --; line 59, for "wire 174" read -- wire 184 --; column 5, line 49, for "remained", second occurrence, read -- remains --.

Signed and sealed this 27th day of July 1965.

(SEAL)
Attest:

ERNEST W. SWIDER                                   EDWARD J. BRENNER
Attesting Officer                                       Commissioner of Patents